(12) United States Patent
Mehl et al.

(10) Patent No.: US 11,797,602 B2
(45) Date of Patent: *Oct. 24, 2023

(54) EVALUATION DATA STRUCTURE FOR EVALUATING A SPECIFIC MOTION PATTERN AND DASHBOARD FOR SETTING UP THE EVALUATION DATA STRUCTURE

(71) Applicant: Kaia Health Software GmbH, Munich (DE)

(72) Inventors: Konstantin Mehl, Munich (DE); Maximilian Strobel, Munich (DE)

(73) Assignee: KAIA HEALTH SOFTWARE GMBH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,920

(22) Filed: Aug. 15, 2022

(65) Prior Publication Data
US 2022/0392263 A1 Dec. 8, 2022

Related U.S. Application Data

(63) Continuation of application No. 16/735,101, filed on Jan. 6, 2020, now Pat. No. 11,450,147.

(51) Int. Cl.
*G06F 16/51* (2019.01)
*G06N 20/20* (2019.01)
(Continued)

(52) U.S. Cl.
CPC .............. *G06F 16/51* (2019.01); *G06F 18/21* (2023.01); *G06F 18/24* (2023.01); *G06N 5/01* (2023.01);
(Continued)

(58) Field of Classification Search
CPC .......... G06F 16/51; G06F 18/21; G06F 18/24; G06N 5/01; G06N 20/20; G06N 3/045;
(Continued)

(56) References Cited

U.S. PATENT DOCUMENTS 9,154,739 B1 * 10/2015 Nicolaou ................. H04N 7/18
9,383,895 B1 * 7/2016 Vinayak .............. G06F 3/04883
(Continued)

FOREIGN PATENT DOCUMENTS

WO WO 2019/175425 * 9/2019

OTHER PUBLICATIONS

Bobick et al., "The Recognition of Human Movement Using Temporal Templates", IEEE Transactions on Pattern Analysis and Machine Intelligence, vol. 23, No. 3, Mar. 2001 (Year: 2001).*

(Continued)

*Primary Examiner* — Qian Yang
(74) *Attorney, Agent, or Firm* — Birch, Stewart, Kolasch & Birch, LLP

(57) ABSTRACT

An editor application configured for setting up at least one evaluation data structure, each evaluation data structure being configured for evaluating a corresponding specific motion pattern in a sequence of image data structures Each evaluation data structure includes a machine learning (ML) model artifact of an exercise specific ML model configured for evaluating the particular physical exercise. Further, the ML model is trained based on a plurality of sequences of image data structures showing different variants of the specific motion pattern for the particular physical exercise, and for each image data structure, a set of key data elements is provided, a key data element indicating a respective position of a landmark in the image data structure, said training being further based on class labels provided for each image data structure. In addition, the ML model is configured to determine, based on input data comprising key data elements provided for at least one image data structure, class labels for each image data structure, said class labels identifying at least one of: at least one motion phase of the specific motion pattern, at least one evaluation point of the (Continued)

specific motion pattern, wherein the key data elements indicate positions of landmarks in the image data structures; generate geometric evaluation data and perform a geometric evaluation of a configuration of key data elements of a particular image data structure that corresponds to an evaluation point or for performing a geometric evaluation of at least one motion phase of the specific motion pattern; and generate feedback data for providing a feedback to the user, said feedback depending on the result of the geometric evaluation. Further, the editor application comprises at least one graphical user interface, the graphical user interface being configured for accepting user input for training the ML model underlying the ML model artefact.

15 Claims, 5 Drawing Sheets

(51) Int. Cl.
G06T 7/20 (2017.01)
G06T 7/60 (2017.01)
G06T 7/70 (2017.01)
G06V 40/20 (2022.01)
G06F 18/21 (2023.01)
G06F 18/24 (2023.01)
G06N 5/01 (2023.01)
G06V 10/75 (2022.01)
G06V 10/764 (2022.01)
G06V 10/82 (2022.01)
G06V 10/62 (2022.01)

(52) U.S. Cl.
CPC .......... *G06N 20/20* (2019.01); *G06T 7/20* (2013.01); *G06T 7/60* (2013.01); *G06T 7/70* (2017.01); *G06V 10/62* (2022.01); *G06V 10/757* (2022.01); *G06V 10/764* (2022.01); *G06V 10/82* (2022.01); *G06V 40/20* (2022.01); *G06V 40/23* (2022.01); *G06T 2200/24* (2013.01); *G06T 2207/20081* (2013.01); *G06T 2207/30196* (2013.01); *G06T 2207/30244* (2013.01)

(58) Field of Classification Search
CPC .... G06N 3/08; G06T 7/20; G06T 7/60; G06T 7/70; G06T 2200/24; G06T 2207/20081; G06T 2207/30196; G06T 2207/30244; G06V 10/62; G06V 10/757; G06V 10/764; G06V 10/82; G06V 40/20; G06V 40/23

See application file for complete search history.

(56) References Cited

U.S. PATENT DOCUMENTS

| | | |
|---|---|---|
| 2014/0270351 A1 | 9/2014 | Hoof et al. |
| 2016/0103887 A1 | 4/2016 | Fletcher et al. |
| 2018/0330810 A1 | 11/2018 | Gamarnik et al. |
| 2019/0321732 A1 | 10/2019 | Zimring et al. |

OTHER PUBLICATIONS

Nweke et al., "Deep learning algorithms for human activity recognition using mobile and wearable sensor networks: State of the art and research challenges", Expert Systems With Applications 105 (2018) 233-261 (Year: 2018).*

Doersch et al. "Sim2real transfer learning for 3D human pose estimation: motion to the rescue", 33rd Conference on Neural Information Processing Systems (NeurIPS 2019), Vancouver, Canada, pp. 1-13.

Pavllo et al. ("30 human pose estimation in video with temporal convolutions and semi-supervised training", Proceedings of the IEEE/CVF Conference on Computer Vision and Pattern Recognition (CVPR), 2019, pp. 7753-7762) (Year: 2019).

Zhang et al. "Deep Learning Methods for 3D Human Pose Estimation under Different Supervision Paradigms: A Survey", Electronics 2021, 10, 2267, pp. 1-25.

* cited by examiner

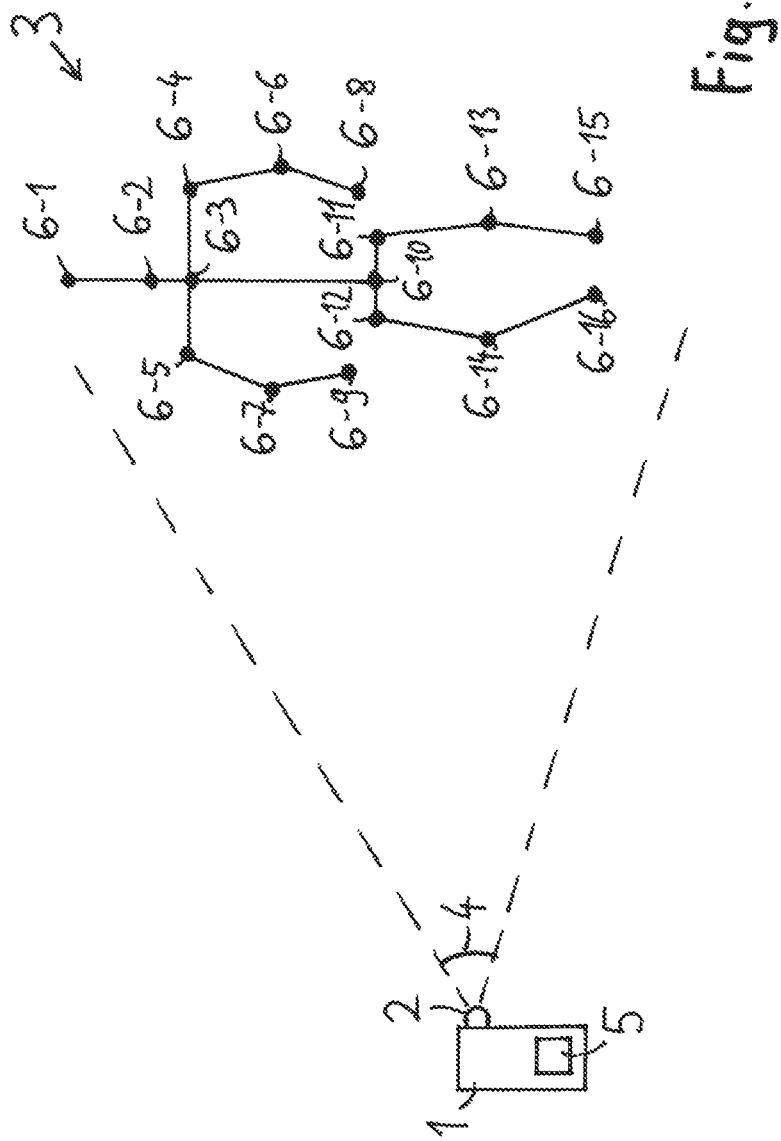

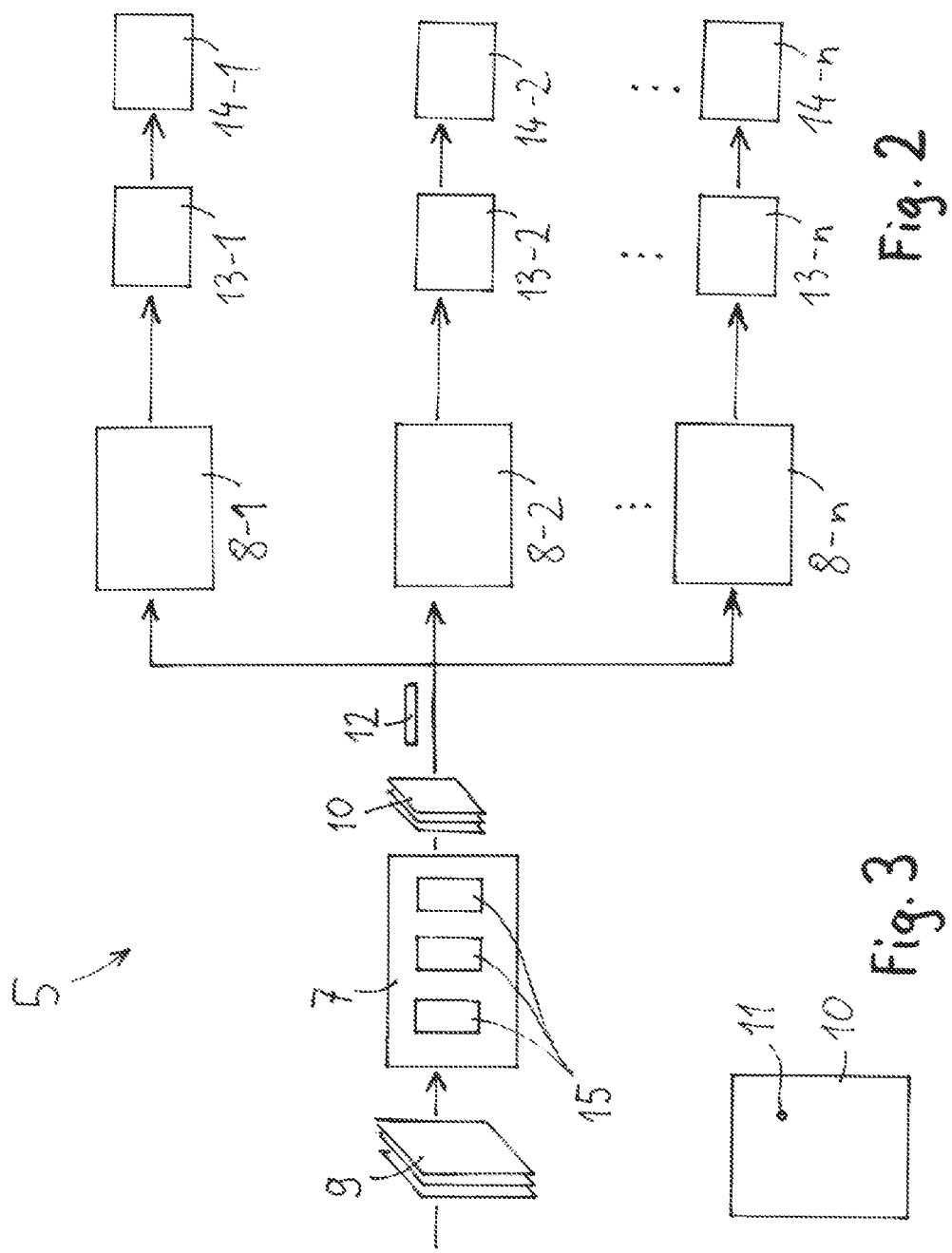

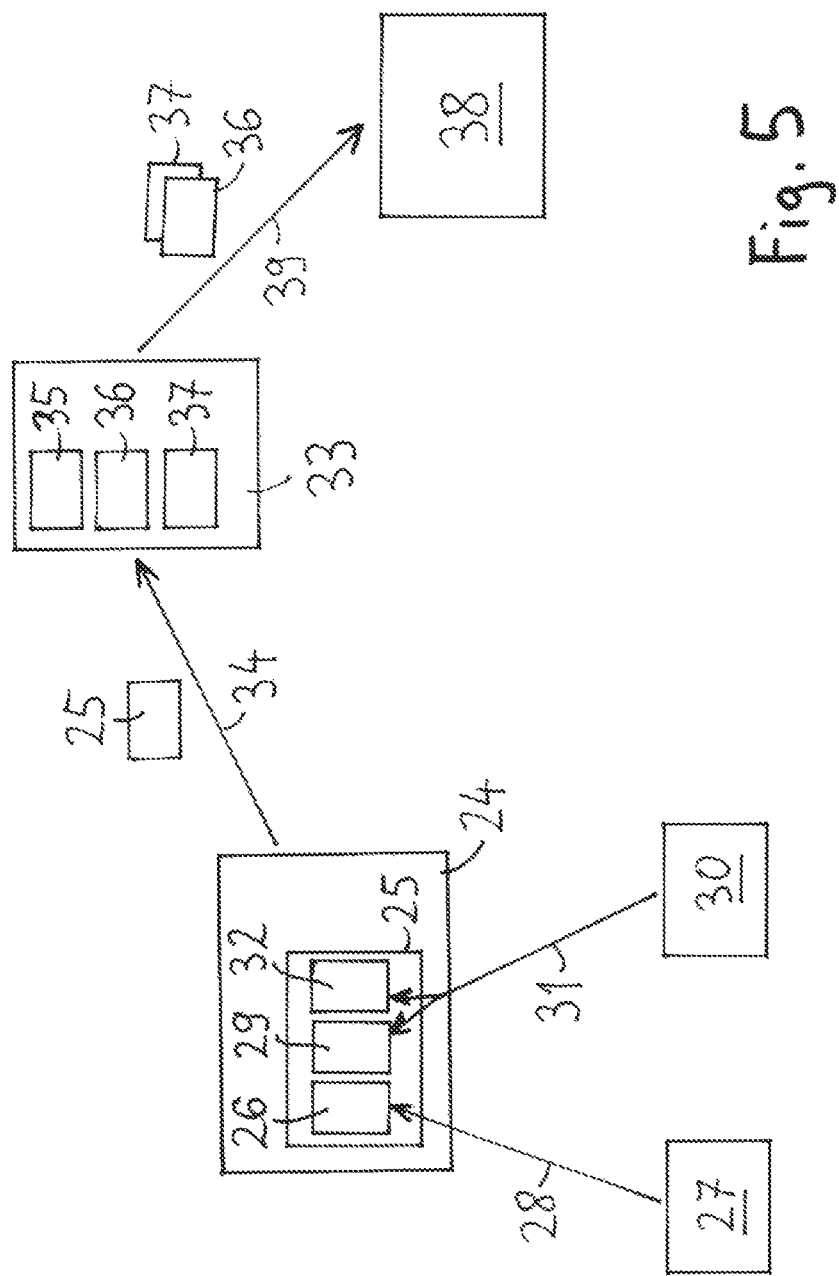

LimbBasedCustomCorrection

ALIAS: Hip hanging through

| | Thorax | Thorax |
|---|---|---|
| max ▼ includedAngle | Pelvis | Pelvis |
| | KneeLeft | KneeRight |

↗ 40

▸ ▸ 170

Otherwise, correct with:

AUDIO_FIRST_TIME — Hebe deine Hüfte etwas mehr sodass dein Körper eine Linie bildet.
41 → Lift your hip a bit so that your body forms one line.

AUDIO_REPEATED — Hebe deine Hüfte noch etwas mehr.
42 → Lift your hip still a bit more.

AUDIO_BETTER_BUT — Besser! Nun hebe deine Hüfte etwas mehr sodass dein Körper eine Linie
43 → Great! Now lift your hip a bit so that your body forms one line.

OPPOSING CORRECTION

Fig. 6

EVALUATION DATA STRUCTURE FOR EVALUATING A SPECIFIC MOTION PATTERN AND DASHBOARD FOR SETTING UP THE EVALUATION DATA STRUCTURE

CROSS REFERENCE TO RELATED APPLICATIONS

This application is a Continuation of co-pending U.S. patent application Ser. No. 16/735,101 filed on Jan. 6, 2020, all of which are hereby expressly incorporated by reference into the present application.

BACKGROUND OF THE INVENTION

Field of the Invention

The invention relates to an editor application configured for setting up at least one evaluation data structure, each evaluation data structure being configured for evaluating a corresponding specific motion pattern in a sequence of image data structures. The invention further relates to a method for setting up an evaluation data structure configured for evaluating a specific motion pattern. In addition, the invention relates to a system comprising an editor application, a web server and a mobile device. The invention relates to an evaluation data structure configured for evaluating a specific motion pattern in a sequence of image data structures, and to a database comprising at least one evaluation data structure of this kind. The invention further relates to a mobile device and to a method for evaluating a motion pattern on a mobile device.

Discussion of the Related Art

U.S. Pat. No. 9,154,739 B1 describes a computer-implemented method, a system and a computer-readable medium that provide useful feedback for a user involved in exercise. A camera is used to track user motion by using image processing techniques to identify key points of a user's body and track their motion. The tracked points are compared to proper form for an exercise, and an embodiment gives feedback based on the relationship between the actual movement of the user and the proper form.

SUMMARY OF THE INVENTION

The object of the invention is to provide for a simplified evaluation of a specific motion pattern in a sequence of image data structures.

According to the invention, an editor application configured for setting up at least one evaluation data structure is provided, each evaluation data structure being configured for evaluating a corresponding specific motion pattern in a sequence of image data structures. Each evaluation data structure comprises a ML model artifact configured for determining, based on input data comprising key data elements provided for at least one image data structure, class labels for each image data structure, said class labels identifying at least one of: at least one motion phase of the specific motion pattern, at least one evaluation point of the specific motion pattern. A key data element indicates a respective position of a landmark in the image data structure. Each evaluation data structure further comprises geometric evaluation data for performing a geometric evaluation of a configuration of key data elements of a particular image data structure that corresponds to an evaluation point or for performing a geometric evaluation of at least one motion phase of the specific motion pattern. Each evaluation data structure further comprises feedback data for providing a feedback to the user, said feedback depending on the result of the geometric evaluation. The editor application comprises at least one graphical user interface, the graphical user interface being configured for accepting user input for setting up and editing the geometric evaluation data and the feedback data.

For evaluating motion patterns in a sequence of image data structures, dedicated evaluation data structures can be set up with an editor application according to the present invention. The evaluation data structures for evaluating a specific motion pattern comprise at least three components. As a first component, the evaluation data structure comprises a ML model artifact configured for classifying each image data structure based on key data elements provided for at least one image data structure. In the present application, the term "ML" stands for "machine learning". For each image data structure, a class label is determined. For example, the motion phases of the motion pattern can be identified. Even complex motion patterns can be segmented into a number of motion phases. Furthermore, the ML model artifact may for example classify an image data structure as being an evaluation point. In this case, a further evaluation of the key data elements in this image data structure may for example be performed. Additionally or alternatively, a geometric evaluation of at least one motion phase of the specific motion pattern may be performed. As a second component, the evaluation data structure comprises geometric evaluation data. As a third component, the evaluation data structure comprises feedback data. In dependence on the outcome of the geometrical evaluation, a suitable feedback may be provided to the user. In the feedback data, this feedback is specified.

With an editor application according to the present invention, this evaluation data structure can be set up in a quick and convenient way. The user may access the editor application via the at least one graphical user interface and set up and edit the geometric evaluation data and the feedback data. By specifying geometric evaluation data for a specific motion pattern, the user can for example define a desired motion pattern. For example, in case deviations from this ideal motion pattern occur, a suitable feedback may be provided. Via the editor application, the user may for example set up different feedback for typical deviations between the acquired motion pattern and the desired motion pattern.

Further according to the invention, a method for setting up an evaluation data structure configured for evaluating a specific motion pattern in a sequence of image data structures is provided. The method comprises providing a ML model artifact configured for determining, based on input data comprising key data elements provided for at least one image data structure, class labels for each image data structure, said class labels identifying at least one of: at least one motion phase of the specific motion pattern, at least one evaluation point of the specific motion pattern. A key data element indicates a respective position of a landmark in the image data structure. The method further comprises specifying geometric evaluation data for performing a geometric evaluation of the configuration of the key data elements of a particular image data structure at one or more evaluation points or for performing a geometric evaluation of at least one motion phase of the specific motion pattern. The method further comprises specifying feedback data for providing feedback, the feedback depending on the result of the geometric evaluation.

Further according to the invention, a system is provided, the system comprising an editor application configured for setting up at least one evaluation data structure, each evaluation data structure being configured for evaluating a specific motion pattern in a sequence of image data structures, and a web server configured for storing the at least one evaluation data structure. The system further comprises a mobile device configured for downloading at least one of the evaluation data structures from the web server and for using the at least one evaluation data structure for evaluating a specific motion pattern. The evaluation data structure comprises a ML model artifact configured for determining, based on input data comprising key data elements provided for at least one image data structure, class labels for each image data structure, said class labels identifying at least one of: at least one motion phase of the specific motion pattern, at least one evaluation point of the specific motion pattern. A key data element indicates a respective position of a landmark in the image data structure. The evaluation data structure further comprises geometric evaluation data for performing a geometric evaluation of a configuration of key data elements of a particular image data structure that corresponds to an evaluation point or for performing a geometric evaluation of at least one motion phase of the specific motion pattern. The evaluation data structure further comprises feedback data for providing a feedback to the user, said feedback depending on the result of the geometric evaluation.

The system according to the invention comprises an editor application, a web server and a mobile device. With the editor application, an evaluation data structure comprising a ML model, geometrical evaluation data and feedback data can be set up. One or more of these evaluation data structures can be stored in the database. A mobile device may access the database and download one or more evaluation data structures from the database to the mobile device. On the mobile device, a respective evaluation data structure can be used for analysing a specific motion pattern in a sequence of image data structures. For this purpose, each image data structure is classified by the ML model artifact and in case an evaluation point is detected, the key data elements of the respective image data structure may for example be evaluated in accordance with the evaluation data. Additionally or alternatively, a geometric evaluation of at least one motion phase of the specific motion pattern may be performed. In dependence on the outcome of this evaluation, feedback in accordance with the feedback data is provided to the user. The evaluation data structure comprising the three components ML learning model, evaluation data and feedback data is suited both for the setup process performed by the editor application and for the evaluation task performed on the mobile device.

Yet further according to the invention, an evaluation data structure configured for evaluating a specific motion pattern in a sequence of image data structures is provided. The evaluation data structure comprises a ML model artifact configured for determining, based on input data comprising key data elements provided for at least one image data structure, class labels for each image data structure, said class labels identifying at least one of: at least one motion phase of the specific motion pattern, at least one evaluation point of the specific motion pattern. A key data element indicates a respective position of a landmark in the image data structure. The evaluation data structure further comprises geometric evaluation data for performing a geometric evaluation of a configuration of key data elements of a particular image data structure that corresponds to an evaluation point or for performing a geometric evaluation of at least one motion phase of the specific motion pattern. The evaluation data structure further comprises feedback data for providing a feedback to the user, said feedback depending on the result of the geometric evaluation.

An evaluation data structure according to the present invention comprises all the information that is needed for analysing and evaluating a specific motion pattern. The evaluation data structure comprises at least three components. As a first component, the evaluation data structure comprises a ML model artifact configured for classifying each image data structure. As a second component, the evaluation data structure comprises geometric evaluation data, and as a third component, the evaluation data structure comprises feedback data. An evaluation data structure comprising the above-described three components can be contained in one single file, for example in a JSON-file. The ML model artifact is capable of determining the motion phases and/or the evaluation points of the motion pattern. Whenever an evaluation point is detected, a geometrical evaluation of the configuration of the key data elements may for example be performed based on the geometric evaluation data. Additionally or alternatively, a geometric evaluation of at least one motion phase of the specific motion pattern may be performed. In dependence on the outcome of the evaluation, feedback may be provided to the user in accordance with the feedback data. Using the evaluation data structures according to the present invention, the complex task of evaluating a motion pattern and providing suitable feedback can be simplified. The evaluation data structure according to the present invention has proven to support these tasks in a favourable manner.

Further according to the invention, a database comprising at least one evaluation data structure as described above is provided.

Yet further according to the invention, a mobile device is provided, the mobile device being configured for downloading at least one evaluation data structure from a web server, each evaluation data structure being an evaluation data structure as described above, wherein the evaluation data structure is configured for evaluating a corresponding specific motion pattern. The mobile device is configured for evaluating a sequence of image data structures using at least one of said evaluation data structures downloaded from the web server. Preferably, the mobile device comprises a camera for acquiring a sequence of image data structures.

Yet further according to the invention, a method for evaluating a motion pattern on a mobile device is provided. The method comprises downloading at least one evaluation data structure from a web server, each evaluation data structure being a data structure as described above, wherein the evaluation data structure is configured for evaluating a corresponding specific motion pattern. The method further comprises evaluating a motion pattern in a sequence of image data structures using at least one of the evaluation data structures downloaded from the web server.

PREFERRED EMBODIMENTS OF THE INVENTION

Preferred features of the invention which may be applied alone or in combination are discussed below and in the dependent claims.

Editor Application

Preferably, the editor application is configured for providing at least one dashboard, the at least one dashboard being configured for accepting user input for setting up and editing the geometric evaluation data and the feedback data of the evaluation data structure. The dashboard may for example provide an overview of the various parts of the evaluation data structure and their relationships. For example, the dashboard may comprise display elements and/or control elements for setting up and editing the geometric evaluation data and the feedback data. In addition, the editor application may for example comprise control elements for setting up, uploading, editing or linking the ML model artifact. Preferably, the dashboard may provide a synoptic view of the different parts of the evaluation data structure and of the way these parts are related to each other. For example, for a particular evaluation point identified by the ML model artifact, corresponding geometric evaluation data may be specified. Furthermore, the geometric evaluation data may for example be related to feedback data that depends on the result of the geometric evaluation.

In a preferred embodiment, the editor application is a web application, wherein the at least one graphical user interface of the editor application is accessible via the internet. A web application may for example be accessed by different persons at remote sites via the internet. For example, a physiotherapist or a doctor may access the web application in order to set up and edit geometric evaluation data and feedback data. By implementing the editor application as a web application, collaborative work of different persons at different locations is supported.

According to a preferred embodiment, the at least one graphical user interface is configured for accepting user input for at least one of: providing, setting up, uploading, training, modifying, linking the ML model artifact of the evaluation data structure. In addition to the geometric evaluation data and the feedback data, also the ML model artifact can be accessed via the editor application.

Preferably, training of the ML model underlying the ML model artifact is based on a plurality of sequences of image data structures showing different variants of the specific motion pattern, wherein for each image data structure, a set of key data elements is provided, a key data element indicating a respective position of a landmark in the image data structure, said training being further based on class labels provided for each image data structure. For example, according to a preferred embodiment, the step of training the ML model may be performed before the ML model is uploaded via the editor application. According to an alternatively preferred embodiment, the editor application may be configured for performing a training step for training the ML model.

In a preferred embodiment, the ML model underlying the ML model artifact is configured for determining class labels for at least one motion phase and for at least one evaluation point, wherein there is a predefined correlation between the at least one motion phase and the at least one evaluation point, with an evaluation point being a specific point of time within a motion phase or between consecutive motion phases.

In a preferred embodiment, a first group of persons is authorized for accessing the ML model artifact via the at least one graphical user interface and a second group of persons is authorized for accessing the geometric evaluation data and the feedback data via the at least one graphical user interface. Different persons may access different parts of the evaluation data structure. A machine learning engineer may for example access the ML model artifact. A physiotherapist or a doctor may for example access the geometric evaluation data and the feedback data.

In a preferred embodiment, the ML model artifact is one of: the ML model itself, an URL to the ML model, a set of parameters defining the ML model. A ML model may be represented in a number of different ways. For example, parameters and attributes defining the ML model's training state may be indicated. For example, in case the ML model is implemented as a decision tree, the decision tree may be represented by a set of numerical values. The same applies to a random forest comprising a plurality of decision trees.

According to a preferred embodiment, the ML model underlying the ML model artifact is a decision tree or a random forest comprising at least one decision tree. A decision tree is descended starting at a root node, wherein each node of the tree acts as a test case for some attribute, and wherein the leaf node indicates a class label. In this regard, a decision tree is well-suited for performing a classification task. A random forest comprises a plurality of separate decision trees, wherein each decision tree of the random forest determines a class label and wherein the classification with the most votes decides the final classification.

Preferably, said feedback depends on whether or not the configuration of key data elements is in conformity with the geometric evaluation data. Furthermore, the feedback may indicate to the user how the motion pattern should be corrected.

Preferably, the feedback data comprises audio feedback for the user. For example, in case the user performs a physical exercise, audio feedback may be helpful for performing the exercise in the right way.

In a preferred embodiment, the specific motion pattern corresponds to a particular physical exercise. An evaluation data structure comprising a ML model artifact, geometric evaluation data and feedback data is especially suited for evaluating the way physical exercises are performed. Preferably, for each physical exercise, a dedicated ML model is provided.

Preferably, the ML model underlying the ML model artifact is an exercise specific ML model configured for evaluating a specific physical exercise, the exercise specific ML model being configured for determining class labels for at least one of: at least one motion phase of the specific physical exercise, at least one evaluation point of the specific physical exercise.

Preferably, the geometric evaluation data is configured for evaluation of a representation of the person's body in an image data structure that corresponds to an evaluation point.

In a preferred embodiment, the geometric evaluation data is configured for evaluation of a configuration of body key points of a particular pose in an image data structure that corresponds to an evaluation point. In this regard, each evaluation point identified by the ML model may for example relate to a particular pose that is to be evaluated in more detail.

According to a preferred embodiment, the geometric evaluation data comprises at least one geometric constraint. Preferably, the at least one graphical user interface is configured for accepting user input for setting up and editing the at least one geometric constraint. For example, the editor application may be configured for specifying at least one geometric constraint. The constraints may for example comprise a constraint specifying a distance between two body key points or a constraint defining an angular range between different body key points. The constraints may be set up interactively via the graphical user interface.

Method for Setting Up a Specific Evaluation Data Structure

In a preferred embodiment, the method further comprises a step of training the ML model, wherein the ML model underlies the ML model artifact, wherein said training is based on a plurality of sequences of image data structures showing different variants of the specific motion pattern, wherein for each image data structure, a set of key data elements is provided, said training being further based on class labels provided for each image data structure.

According to a preferred embodiment, after the training step, the ML model artifact is configured for determining class labels for the image data structures of a sequence of image data structures showing the specific motion pattern, said class labels identifying at least one of: at least one motion phase of the specific motion pattern, at least one evaluation point of the specific motion pattern. After the training step has been performed, the ML model artifact is trained for evaluating a specific motion pattern. In particular, the trained ML model is capable of identifying motion phases and/or evaluation points of the motion pattern. At each evaluation point, a further geometric evaluation of the corresponding image data structure may for example be performed.

In a preferred embodiment, after the training step, the ML model artifact is configured for determining class labels for at least one motion phase and for at least one evaluation point, wherein there is a predefined correlation between the at least one motion phase and the at least one evaluation point, with an evaluation point being a specific point of time within a motion phase or between consecutive motion phases.

Preferably, the ML model artifact is one of the ML model itself, an URL to the ML model, a set of parameters defining the ML model.

Preferably, after the training step, the ML model is configured for evaluating a specific motion pattern.

In a preferred embodiment, the specific motion pattern corresponds to a particular physical exercise.

In a further preferred embodiment, the ML model underlying the ML model artifact is a decision tree or a random forest comprising at least one decision tree.

Preferably, the ML model artifact is accessed via a graphical user interface of an editor application.

According to a preferred embodiment, the geometric evaluation data and the feedback data are accessed via a graphical user interface of an editor application.

System Comprising an Editor Application, a Web Server and a Mobile Device

In a preferred embodiment, the editor application is a web application, wherein at least one graphical user interface of the editor application is accessible via the internet.

In a preferred embodiment, the ML model underlying the ML model artifact is an ML model that is trained for classifying at least one of: at least one motion phase of the specific motion pattern, at least one evaluation point of the specific motion pattern, wherein said training is based on a plurality of sequences of image data structures showing different variants of the specific motion pattern, wherein for each image data structure, a set of key data elements is provided, said training being further based on class labels provided for each image data structure.

Preferably, the ML model artifact is one of the ML model itself, an URL to the ML model, a set of parameters defining the ML model.

Evaluation Data Structure

In a preferred embodiment, the ML model underlying the ML model artifact is an ML model that is trained for classifying at least one of: at least one motion phase of the specific motion pattern, at least one evaluation point of the specific motion pattern, said training being based on a plurality of sequences of image data structures showing different variants of the specific motion pattern, wherein for each image data structure, a set of key data elements is provided, said training being further based on class labels provided for each image data structure.

In a preferred embodiment, the ML model underlying the ML model artifact is configured for determining class labels for at least one motion phase and for at least one evaluation point, wherein there is a predefined correlation between the at least one motion phase and the at least one evaluation point, with an evaluation point being a specific point of time within a motion phase or between consecutive motion phases.

Preferably, the ML model artifact is one of the ML model itself, an URL to the ML model, a set of parameters defining the ML model.

Preferably, the specific motion pattern corresponds to a particular physical exercise.

In a preferred embodiment, the evaluation data structure is implemented as a JSON-file. JSON is an open file format or data interchange format. A JSON-file may for example contain the ML model artifact, the geometric evaluation data and the feedback data.

BRIEF DESCRIPTION OF THE DRAWINGS

The invention is illustrated in greater detail with the aid of schematic drawings. It shows schematically:

FIG. 1 shows a mobile device configured for predicting body key points indicating a person's posture for a sequence of image frames.

FIG. 2 shows an arrangement of several machine learning models configured for evaluating a person's movement when performing a physical exercise.

FIG. 3 shows a feature map indicating a position of a particular body key point.

FIG. 4 shows how a sequence of image frames showing a person performing a physical exercise is analysed by the machine learning models.

FIG. 5 shows a dashboard that is used for setting up and configuring evaluation data structures for evaluating a particular physical exercise.

FIG. 6 shows a part of the dashboard's graphical user interface that is used for defining constraints and feedback data.

DETAILED DESCRIPTION OF THE EMBODIMENTS

In the following description of preferred embodiments of the present invention, identical reference numerals denote identical or comparable components.

In the following, a system for acquiring a sequence of image frames showing a person performing physical exercising and for analysing the person's motion is described. The system may for example be configured for evaluating various different physical exercises. In this regard, physical exercising may comprise performing one single physical exercise, like for example a plank. Physical exercising may also comprise performing several repetitions of a physical exercise, like for example several repetitions of a squat. Physical exercising may also comprise yoga sequences comprising one or more specific poses.

FIG. 1 shows how the sequence of image frames showing the person's physical exercising is acquired. A mobile device 1 with a camera 2 is located at a distance from a person 3 performing physical exercises. The mobile device 1 may for example be a smartphone, a tablet, a laptop, etc. Preferably, the mobile device 1 is arranged such that the entire body of the person 3 is within the camera's field of view 4. In this position, the mobile device 1 can acquire a sequence of image frames, preferably a video sequence of the person's movements.

On the mobile device 1, a software application 5 may be implemented, the software application 5 comprising a dedicated machine learning model like for example a neural network configured for predicting, for each image frame, a set of body key points indicating the posture of the person's body. In the example shown in FIG. 1, the person's posture is described by the respective positions of 16 different body key points 6-1 to 6-16. The body key points 6-1 to 6-16 may for example be assigned to the joints of the body and to body features like for example the forehead, the chin, the breastbone, the hip, etc. The body key points 6-1 to 6-16 form a skeleton of the human body and allow for detecting the orientation of different parts of the body relative to each other. Instead of the set of body key points, any other representation of the person's body may be used for describing the person's posture, like for example a 3D mesh of the person's body. By tracking the positions of the body key points or any other representation of the person's body in the sequence of image frames, the person's movements when performing the physical exercise can be evaluated. The camera 2 may for example be a 2D-camera, a 2.5D-camera or a 3D-camera. The body key points 6-1 to 6-16 predicted for each image frame may for example be 2D-points, 2.5D-points or 3D-points.

Preferably, the software application 5 for processing the acquired image frames is implemented on the mobile device 1 itself. In an alternatively preferred embodiment, a stationary computer with a camera is used for acquiring the image frames and for processing the image data. In yet another preferred embodiment, the mobile device comprises a camera and a wireless interface for configured for transmitting the image frames to a remote computer or to a cloud server. In this embodiment, the neural network for predicting key points based on the sequence of image frames is implemented on the remote computer or on the cloud server. In yet another preferred embodiment, a camera is coupled with a transmitter, with the transmitter being configured for transmitting the acquired image frames to a remote computer or to a cloud server for further processing.

FIG. 2 shows an example implementation of the software application 5 comprising an arrangement of different machine learning models. The software application 5 shown in FIG. 2 comprises a pose estimation model 7 and a plurality of classification models 8-1 to 8-$n$.

A sequence of image frames 9 acquired by the camera 2 is provided to the pose estimation model 7. The image frames 9 provided to the pose estimation model 7 may for example comprise two-dimensional image data in three different colours, which may for example be represented as a 1024×1024×3 pixel data structure. The pose estimation model 7 is configured for predicting, for each image frame 9, a plurality of body key points 6-1 to 6-16.

The output of the pose estimation model 7 may for example comprise a set of feature maps 10, with each of the feature maps 10 corresponding to one particular body key point. Hence, for predicting sixteen body key points, the pose estimation model 7 will provide a set of sixteen feature maps per image frame. In this example, a data structure with 64×64×16 pixels may for example be obtained as an output of the pose estimation model 7.

As shown in FIG. 3, a feature map 10 is a two-dimensional matrix indicating respective probabilities for each position that the respective body key point is located at that position. The position with the highest probability corresponds to the body key point's position 11. Hence, the easiest technique is to use the point with the highest probability as the body key point's position. Alternatively, the position of the maximum probability may for example be determined by using Gaussian fitting or a similar technique.

In this regard, each of the sixteen feature maps yields the position of one of the sixteen body key points 6-1 to 6-16. The thus determined sixteen body key points together form a skeleton representation of the person's posture in the corresponding image frame. Alternatively, the pose estimation model 7 may for example provide any other representation of the person's body, like for example a 3D mesh of the person's body or a skeleton representation. In any case, the pose estimation model 7 provides a representation of the person's posture in a particular image frame.

The software application 5 shown in FIG. 2 further comprises a plurality of classification models 8-1 to 8-$n$, wherein for each physical exercise to be evaluated, a dedicated classification model is provided, said classification model being trained for classifying motion phases, rest phases and evaluation points of this particular physical exercise.

The classification task performed by the classification models 8-1 to 8-$n$ is based on the skeleton representations obtained at the output of the pose estimation model 7. For each image frame, a feature vector 12 comprising a number of entries is forwarded, as an input, to one of the classification models 8-1 to 8-$n$ that corresponds to the physical exercise performed by the user. The feature vector 12 comprises body key points of the image frame under consideration and body key points of a number of preceding image frames, for example body key points of four preceding image frames. Alternatively or additionally, the feature vector may comprise body key points of future image frames, which may further improve the accuracy of the classification. In this case, a time delay will occur until the feature vector 12 can be forwarded to one of the classification models 8-1 to 8-$n$. The feature vector 12 may comprise all body key points of the skeleton representation or a just a subset of these body key points, and it may further comprise additional parameters derived from the body key points. Providing further parameters in addition to the body key points may promote the classification task performed by the classification models 8-1 to 8-$n$.

Based on this feature vector 12, the classification model classifies the particular image frame under consideration. Possible classifications include one or more motion phases, like for example a downward motion or an upward motion, a rest phase, and one or more evaluation points. At the one or more evaluation points, a further geometric evaluation of the person's pose at this evaluation point is performed.

Preferably, there is a predefined correlation between the one or more motion phases of the motion pattern and the at least one evaluation point. An evaluation point may for example be a specific point of time within a particular motion phase, for example a start point, an intermediate point or an end point of the particular motion phase. For example, the evaluation point may be a point of time where a reversal of the body's movement occurs. According to a further example, an evaluation point may be a point of time within a motion phase where a characteristic parameter, for example a characteristic parameter derived from key points of the image frames, assumes a minimum or a maximum value. According to a further example, an evaluation point may be located at a transition between two consecutive motion phases. For example, in case of a squat, an evaluation point may be located at the transition from the downward motion phase to the upward motion phase.

Whenever an evaluation point is identified by one of the classification models 8-1 to 8-*n*, a geometric evaluation 13-1 to 13-*n* of the person's pose at this evaluation point is performed. For evaluating the pose, body key points related to the person's pose at the evaluation point or parameters derived therefrom are compared with one or more predefined geometric constraints. The geometric constraints define an ideal pose of the person at this evaluation point. In dependence on the outcome of the geometric evaluation, a feedback 14-1 to 14-*n*, for example an audio feedback or a text message, is provided to the person.

Alternatively, motion phases could be analysed directly. Ways of analysing could for example comprise evaluating the timing of the motion phase or analysing the curve of a specific characteristic parameter, for example a curve that indicates the movement of the left hip, with regard to its smoothness or with regard to the value of this curve's derivative within this motion phase.

Firstly, the pose estimation model 7 will be discussed in more detail. The pose estimation model 7 may for example be implemented as a convolutional neural network configured for determining respective positions of body key points in the image frames 9 of a sequence of image frames. The convolutional neural network comprises a sequence of consecutive layers 15 configured for processing the image data, with the layers 15 comprising one or more of the following: at least one convolutional layer, at least one non-linear layer, at least one pooling layer, at least one classifier, at least one fully connected layer. For example, a neural network with a stacked hourglass architecture may be employed, as described in the article by A Newell, K Yang and J Deng "Stacked hourglass networks for human pose estimation", European Conference on Computer Vision, October 2016, pp 483-499, Springer International Publishing, https://arxiv.org/abs/1603.06937.

Next, the classification models 8-1 to 8-*n* will be discussed in more detail. For performing the classification task, a machine learning model like for example a decision tree or a random forest comprising a plurality of decision trees may be used. In the following, a classification model based on a decision tree is described.

Decision trees are a method for the automatic classification of data objects and thus for solving decision problems. A decision tree always consists of a root node, any number of inner nodes, and at least two leafs. Each node represents a decision rule and each leaf represents a classification, i e an answer to the decision problem. Decision tree learning uses a decision tree as a predictive model to go from observations about an item (represented in the branches) to conclusions about the item's target value represented in the leafs. Tree models where the target variable can take a discrete set of values are called classification trees.

Classification comprises a learning step for developing the model based on given training data. In a subsequent prediction step, the model can be used for predicting the classification for given data.

The learning step is based on a large amount of training data, wherein for each data item, a corresponding classification is known. In the present case, a large amount of video data showing different people performing a particular physical exercise, for example a squat, is acquired and for each image frame, a corresponding classification is specified. Said classifications may for example comprise a rest phase, one or more motion phases, one or more evaluation points. In particular, for a squat, the possible classifications may comprise the rest position, a downward movement, an evaluation point at the lowest point of the person's movement and an upward movement. In this example, the evaluation point is located at the transition between the downward motion phase and the upward motion phase. The training data may also comprise physical exercises performed in an erroneous manner, in order to be able to classify erroneously performed exercises.

Based on this training data, the decision tree is constructed in a top-down approach. At first, the attribute of the feature vector having the highest predictive value for the classification task is determined. For selecting the attribute having the highest predictive value, an attribute selection measure (ASM) is determined. Most popular selection measures are information gain, gain ratio, and Gini index. The best score attribute will be selected as a splitting attribute. This attribute is made a decision node, and based on this attribute's value, the training data set is split into smaller subsets. Tree-building is continued by repeating this process recursively for each child node. For a child node, the attribute having the second-highest predictive value is determined, and this attribute is made a further decision node configured for splitting the subset at the child note into smaller subsets. This process is continued until the leaf nodes of the decision tree yield a proper classification for each possible feature vector.

After the classification model has been trained, the model can be used for predicting the classification of an arbitrary feature vector. In particular, the decision tree may classify a given feature vector by sorting the feature vector's attributes down the tree from the root to some leaf node, with the leaf node providing the classification of the respective feature vector. This approach is called a top-down approach. Each node in the tree acts as a test case for some attribute, and each edge descending from that node corresponds to one of the possible answers to the test case. This process is repeated until the leaf node indicating a classification is reached. For example, in case of a squat, the possible classifications for a given feature vector may for example comprise "rest position", "downward movement", "evaluation point", "upward movement".

For improving the predictive power of the classification model, a random forest comprising a plurality of uncorrelated decision trees may be used instead of a single decision tree. In this case, each tree in the forest may make a decision and the classification with the most votes decides the final classification.

The different classification models 8-1 to 8-*n* shown in FIG. 2 correspond to different physical exercises. For each physical exercise, the corresponding classification model may be trained based on a certain amount of video sequences showing different persons performing one particular physical exercise in a variety of different ways.

In FIG. 4, an overview of the method for evaluating a person's movement when performing physical exercising is given. In the first row of FIG. 4, a sequence of image frames 16-1 to 16-5 showing a person performing a squat is given. The five image frames 16-1 to 16-5 have been acquired at five different points of time t4, t3, . . . t0.

In a first step 17, the image frames 16-1 to 16-5 are input to the pose estimation model 7, which delivers, for each of the image frames, a corresponding set of sixteen feature maps indicating the respective positions of the sixteen body key points. In the second row of FIG. 4, for each of the image frames 16-1 to 16-5, the corresponding feature maps 18-1 to 18-5 are shown.

In a subsequent step 19, a skeleton representation of the person's pose is provided by determining the respective positions of the body key points in the feature maps 18-1 to 18-5. Alternatively, a different representation of the person's body like for example a 3D mesh may be provided. The skeleton representations 20-1 to 20-5 are depicted in the third row of FIG. 4.

In a subsequent step 21, the skeleton representations 20-1 to 20-5 of five consecutive image frames or a subset of these representations are provided as input data to the classification model that corresponds to the exercise "squat", for example to the classification model 8-4. The skeleton representations are provided as a feature vector 12 to the classification model 8-4.

Based on this input data, the classification model 8-4 provides a classification for each one of the image frames 16-1 to 16-5. For the first two image frames 16-1, 16-2, the classification model 8-4 provides the class labels 22-1 and 22-2, which indicate "no squat". For image frames 16-3, 16-4, the classification model 8-4 provides the class labels 22-3 and 22-4, which indicate "squat start". The class label "squat start" triggers an audio indication 23 as well as user interface changes. In image frame 16-5, the person has reached the lowest position of the squat and accordingly, the classification model 8-4 outputs the class label 22-5 "evaluation point". In this example, the evaluation point is located at the transition between the downward motion phase and the upward motion phase. The class label "evaluation point" triggers a further geometric evaluation 13-4 of the person's pose in image frame 16-5. For example, the angles between different joints are compared with predefined constraints, the distances between neighbouring joints are evaluated, etc. In dependence on the outcome of the geometric evaluation 13-4, an audio feedback 14-4 is provided to the user. For example, the user may be asked to keep his head straight, to keep the hands next to the knees, etc.

FIG. 5 shows how a dashboard, for example a web-based dashboard, is used for setting up an evaluation data structure representing one particular physical exercise. The dashboard 24 may for example be a web-based application that allows for accessing an evaluation data structure 25 via one or more access paths, for example via login and password. The dashboard 24 provides a graphical user interface that allows for interactively editing the evaluation data structure 25.

The evaluation data structure 25 may for example comprise three different components. The first component is a classification model artifact 26 configured for identifying rest positions, motion phases and evaluation points of one particular physical exercise, for example a squat. The classification model artifact 26 may either be the machine learning model itself or some kind of representation of the machine learning model, for example attributes and parameters of the machine learning model.

The classification model artifact 26 may for example be set up and configured by a machine learning engineer 27. The machine learning engineer 27 is responsible for performing the learning step of the classification model based on a large amount of video data showing different persons performing one particular physical exercise in different possible ways. Based on this training data, the classification model is trained for performing a classification of motion phases, rest phases and evaluation points of this particular exercise. In case of a squat, the classification model may for example be trained for recognising a rest position, a downward movement, an evaluation point, which is the lowest point of the person's movement, and an upward movement. After the step of training the classification model has been performed, either the classification model itself or the characteristic attributes and parameters of this model may be uploaded to the dashboard 24 via an access path 28. The classification model artifact 26 is the first component of the evaluation data structure 25.

For a certain physical exercise, the classification model may define one or more evaluation points. At each evaluation point, an evaluation of the person's pose at this point of time is performed, and based on this evaluation, feedback is provided to the person. There may exist a predefined interdependency between the one or more motion phases of the motion pattern and the one or more evaluation points. For example, in case of a squat, the person's pose at its lowest point is evaluated.

For performing this evaluation, the evaluation data structure 25 comprises, as a second component, evaluation data 29. The evaluation data 29 may for example comprise a set of geometric constraints for a particular pose. Such constraints may for example define an angular range between three body key points, distances between different body key points or any other kind of geometric proportions and relations that are characteristic for a particular pose. In case an exercise is not performed in a correct manner and the constraints as defined in the evaluation data 29 are not fulfilled, a feedback is provided to the person performing the exercise. The evaluation data 29 may be configured by a physiotherapist or by a doctor 30. For setting up the evaluation data 29, the physiotherapist or doctor 30 may access the graphical user interface of the web-based dashboard 24 or a dedicated sub-area of this graphical user interface via an access path 31.

The feedback may for example be audio feedback or a text message displayed to the user. The evaluation data structure 25 comprises feedback data 32 as a third component. The feedback data 32 may also be set up by the physiotherapist or doctor 30 by accessing the graphical user interface of the dashboard 24 or a dedicated sub-area thereof.

FIG. 6 shows a part of the graphical user interface of the dashboard 24 that may be accessed by the physiotherapist or doctor 30 in order to specify constraints and feedback data. The example of FIG. 6 relates to a physical exercise called a "plank". In this physical exercise, a person assumes a horizontal position, wherein the body forms a straight line. The constraint 40 relates to the angle between the body key points of the thorax, the pelvis and the left knee. The constraint 40 defines that for correctly performing a plank, the angle between thorax, pelvis and left knee has to exceed 170°. In case this constraint 40 is not fulfilled and the angle between thorax, pelvis and left knee is below 170°, the hip is hanging through, which is not correct. In this case, an audio feedback is provided to the user. This audio feedback is specified in the lower section of FIG. 6. If the constraint is not met for the first time, the audio feedback 41 "Lift your hip a bit so that your body forms one line" is output. In case the constraint is still not fulfilled, a second audio feedback 42 "Lift your hip still a bit more" is output. In case the user's performance has improved, but the constraint is still not met, the audio feedback 43 "Great! Now lift your hip a bit so that your body forms one line" is output. The feedback may be specified by the physiotherapist or doctor 30 as an audio file. Alternatively, the audio feedback may be specified as a text message that is automatically converted into an audio message. As further option, a text message may be displayed to the user on the display of the mobile device.

As soon as the classification model artifact 26, the evaluation data 29 and the feedback data 32 have been specified, all the data required for analysing and evaluating a respective physical exercise is complete. The evaluation data structure 25 may for example be a JSON-file according to the standard JavaScript Object Notation, with the JSON-file comprising an URL of the classification model, an URL of the pose model, evaluation data 29 and feedback data 32 encapsulated as one single file containing all information required for evaluating one particular physical exercise. The evaluation data structure 25 is transmitted to a database 33, as indicated by arrow 34. In the database 33, a plurality of evaluation data structures 35, 36, 37 related to different physical exercises are stored. Each of the evaluation data structures 35, 36, 37 comprises the three components classification model artifact, evaluation data and feedback data.

A mobile device 38 may now access the database 33 and download one or more evaluation data structures 36, 37 from the database 33 to the mobile device 38, as indicated by arrow 39. On the part of the mobile device 38, the downloaded evaluation data structures can be used for analysing and evaluating the movement of a person performing a physical exercise that corresponds to one of the evaluation data structures 36, 37.

The features described in the above description, claims and figures can be relevant to the invention in any combination.

What is claimed is:

1. An editor application configured for setting up at least one evaluation data structure, each evaluation data structure being configured for evaluating a corresponding specific motion pattern in a sequence of image data structures, wherein each evaluation data structure comprises:
   a machine learning (ML) model artifact of an exercise specific ML model configured for evaluating a particular physical exercise,
   wherein the ML model is trained based on a plurality of sequences of image data structures showing different variants of the specific motion pattern for the particular physical exercise, wherein for each image data structure, a set of key data elements is provided, a key data element indicating a respective position of a landmark in the image data structure, said training being further based on class labels provided for each image data structure,
   wherein the ML model is configured to:
   determine, based on input data comprising key data elements provided for at least one image data structure, class labels for each image data structure, said class labels identifying at least one of: at least one motion phase of the specific motion pattern, at least one evaluation point of the specific motion pattern, wherein the key data elements indicate positions of landmarks in the image data structures;
   generate geometric evaluation data and perform a geometric evaluation of a configuration of key data elements of a particular image data structure that corresponds to an evaluation point or for performing a geometric evaluation of at least one motion phase of the specific motion pattern; and
   generate feedback data for providing a feedback to the user, said feedback depending on the result of the geometric evaluation;
   wherein the editor application comprises at least one graphical user interface, the graphical user interface being configured for accepting user input for training the ML model underlying the ML model artefact.

2. The editor application according to claim 1, wherein the editor application is configured for providing at least one dashboard, the at least one dashboard being configured for accepting user input for setting up and editing the geometric evaluation data and the feedback data of the evaluation data structure.

3. The editor application according to claim 1, wherein the editor application is a web application, wherein the at least one graphical user interface of the editor application is accessible via the internet.

4. The editor application according to claim 1, wherein the ML model underlying the ML model artifact is configured for determining class labels for at least one motion phase and for at least one evaluation point, wherein there is a predefined correlation between the at least one motion phase and the at least one evaluation point, with an evaluation point being a specific point of time within a motion phase or between consecutive motion phases.

5. The editor application according to claim 1, wherein the ML model underlying the ML model artifact is a decision tree or a random forest comprising at least one decision tree.

6. The editor application according to claim 1, wherein the specific motion pattern corresponds to the particular physical exercise.

7. The editor application according to claim 6, wherein the geometric evaluation data is configured for evaluation of a representation of the person's body in an image data structure that corresponds to an evaluation point.

8. The editor application according to claim 6, wherein the geometric evaluation data is configured for evaluation of a configuration of body key points of a particular pose in an image data structure that corresponds to an evaluation point.

9. The editor application according to claim 6, wherein the geometric evaluation data comprises at least one geometric constraint.

10. The editor application according to claim 9, wherein the at least one graphical user interface is configured for accepting user input for setting up and editing the at least one geometric constraint.

11. The editor application according to claim 1, wherein the ML model underlying the ML model artifact is an exercise specific ML model configured for evaluating a specific physical exercise, the exercise specific ML model being configured for determining class labels for at least one of: at least one motion phase of the specific physical exercise, at least one evaluation point of the specific physical exercise.

12. A method for setting up an evaluation data structure configured for evaluating a specific motion pattern in a sequence of image data structures, the specific motion pattern corresponding to a particular physical exercise, the method comprising:
   providing a machine learning (ML) model artifact of an exercise specific ML model;
   training the ML model, wherein the ML model underlies the ML model artifact, wherein said training is based on a plurality of sequences of image data structures showing different variants of the specific motion pattern, wherein for each image data structure, a set of key data elements is provided, said training being further based on class labels provided for each image data structure;
   evaluating by the ML model, the particular physical exercise, including determining, by the ML model, based on input data comprising key data elements provided for at least one image data structure, class labels for each image data structure, said class labels identifying at least one of: at least one motion phase of the specific motion pattern, at least one evaluation point of the specific motion pattern, wherein the key data elements indicate positions of landmarks in the image data structures;
   generating geometric evaluation data, by the ML model, and performing, by the ML model, a geometric evaluation of the configuration of the key data elements of a particular image data structure at one or more evaluation points or for performing a geometric evaluation of at least one motion phase of the specific motion pattern; and specifying feedback data for providing feedback, the feedback depending on the result of the geometric evaluation.

13. The method according to claim 12, wherein after the training step, the ML model artifact is configured for determining class labels for the image data structures of a sequence of image data structures showing the specific motion pattern, said class labels identifying at least one of: at least one motion phase of the specific motion pattern, at least one evaluation point of the specific motion pattern.

14. The method according to claim 12, wherein after the training step, the ML model is configured for evaluating a specific motion pattern.

15. A system comprising
an editor application configured for setting up at least one evaluation data structure, each evaluation data structure being configured for evaluating a specific motion pattern in a sequence of image data structures;
a web server configured for storing the at least one evaluation data structure;
a mobile device configured for downloading at least one of the evaluation data structures from the web server and for using the at least one evaluation data structure for evaluating a specific motion pattern;
wherein the evaluation data structure comprises:
a machine learning (ML) model artifact of an exercise specific ML model configured for evaluating a particular physical exercise,
wherein the ML model is trained based on a plurality of sequences of image data structures showing different variants of the specific motion pattern for the particular physical exercise, wherein for each image data structure, a set of key data elements is provided, a key data element indicating a respective position of a landmark in the image data structure, said training being further based on class labels provided for each image data structure,
wherein the ML model is configured to:
determine based on input data comprising key data elements provided for at least one image data structure, class labels for each image data structure, said class labels identifying at least one of: at least one motion phase of the specific motion pattern, at least one evaluation point of the specific motion pattern, wherein the key data elements indicate positions of landmarks in the image data structures;
generate geometric evaluation data and perform a geometric evaluation of a configuration of key data elements of a particular image data structure that corresponds to an evaluation point or for performing a geometric evaluation of at least one motion phase of the specific motion pattern; and
generate feedback data for providing a feedback to the user, said feedback depending on the result of the geometric evaluation;
wherein the editor application comprises at least one graphical user interface, the graphical user interface being configured for accepting user input for training the ML model underlying the ML model artefact.

* * * * *